Oct. 15, 1968   W. E. FOSTER   3,406,086
TRANSPARENT SAFETY LAMINATES AND METHOD OF MAKING SAME
Filed March 31, 1965
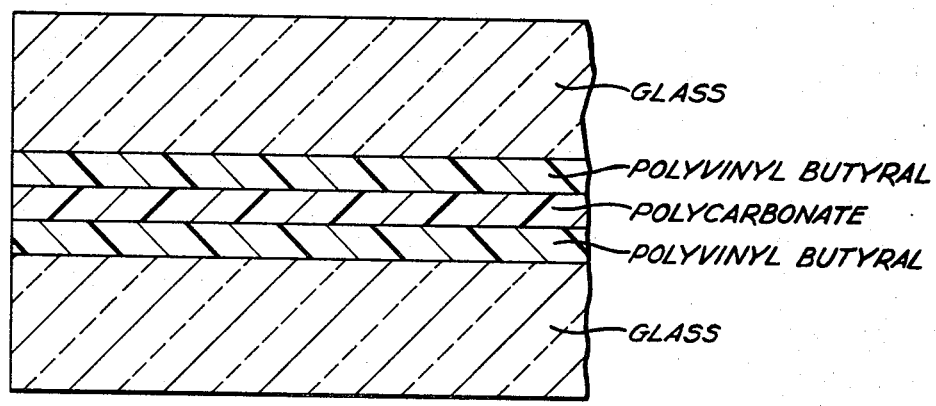
INVENTOR.
WILLIAM E. FOSTER
BY
ATTORNEYS 3,406,086
TRANSPARENT SAFETY LAMINATES AND
METHOD OF MAKING SAME
William E. Foster, Pittsburgh, Pa., assignor to Mobay
Chemical Company, Pittsburgh, Pa., a corporation of
Delaware
Filed Mar. 31, 1965, Ser. No. 444,212
5 Claims. (Cl. 161—183)

ABSTRACT OF THE DISCLOSURE

Laminated articles, including safety glass, where a sheet of polyaryl carbonate is bonded to a transparent panel with a sheet of polyvinyl acetal in face-to-face contact by assembling the three components with a polyvinyl acetal between the polyaryl carbonate and the transparent panel and heating the assembled article for five to fifteen minutes at a temperature of 300 to 400° F. and a pressure of 1 to 50 pounds per square inch.

---

This invention relates to a laminated article and more particularly to a method of laminating polycarbonate and glass.

It has been proposed heretofore to prepare safety glass by laminating glass with polycarbonate. In the previous attempts to laminate glass and polycarbonate an inner layer of a polyvinyl acetal has been used to provide a strong lamination which has high impact strength. In the preparation of laminated articles, it is generally desirable to use relatively high temperatures and high pressures when making up the final assembly of glass-polycarbonate and polyvinyl acetal. It has been found, however, that for some unexplainable reason, the laminates prepared according to the normal cycle viz. 200 to 250° F., 220 to 300 lbs./in.² for 15 to 30 minutes fails to produce a satisfactory bond between the polycarbonate and the polyvinyl acetal. One cannot go to greatly increased temperatures to improve the bond because the polycarbonate tends to flow at higher temperatures and loses its integrity. Furthermore, the polyvinyl acetal will be damaged by elevated temperatues.

It is therefore an object of this invention to provide a laminated article based on polyarylcarbonate, polyvinyl acetal and glass and a method for the preparation thereof which is substantially free of the foregoing disadvantages. Still a further object of this invention is to provide an autoclave cycle for use in the production of multi-part transparent laminates of polyarylcarbonate, polyvinyl acetal and glass which will produce a better bond between the parts of the laminate. Still another object of this invention is to provide a glass-polyarylcarbonate laminant which has less tendency to delaminate under high impact and which shows good stability to Dry Ice temperatures. A further object of this invention is to provide an improved method for laminating polycarbonate to glass without causing the polycarbonate to flow substantially and without harming the polyvinyl acetal.

These and other objects of the invention will become apparent from the following description and the accompanying drawing.

The foregoing objects and others are accomplished in accordance with the invention, generally speaking, by providing a laminated article and a method for the preparation thereof which comprises heating a polyarylcarbonate assembled with glass or other pellucid sheet-like material with a polyvinyl acetal therebetween at a temperature of from about 325° F. to about 400° F. for from about 5 to 10 minutes at a pressure sufficient to hold the assembled laminant together but less than 50 lbs./in.². Therefore, whereas in the prior processes it has been taught to assemble the polycarbonate and the glass with the polyvinyl acetal therebetween and then pass the assembled laminant into an oil autoclave or other high pressure equipment and heat it to a temperature of 250 to 350° F. at a pressure of 180 to 250 lbs./in.² for 10 to 15 minutes, it has now been found that if the autoclave cycle is such that the temperature is from about 325° F. to 400° F. for 5 to 15 minutes, and while the pressure is very low, usually from about 1 to 50 lbs./in.², a vastly improved laminant is obtained which has much better resistance to impact, even at Dry Ice temperatures than the heretofore known laminants prepared by the old laminating cycle.

The laminated article of the present invention is preferably made up of five sheets, two of glass, two of polyvinyl acetal and one of polyarylcarbonate. The polyarylcarbonate preferably forms the center layer which is sandwiched between two sheets of polyvinyl acetal which is in turn sandwiched between two sheets of glass.

The polyvinyl is preferably plasticized with a phosphate in order to provide a suitable sheet of polyvinyl acetal for laminating according to the present invention. The phosphate is employed preferably in an amount of from about 5 to 60% by weight of the polyvinyl acetal. An amount of phosphate in this range provides for satisfactory plasticization of the polyvinyl acetal and yet the adhesion of the glass to the polyarylcarbonate is satisfactory and there is no stress cracking or cloudiness in the product. Many plasticizers for polyvinyl acetal cause stress cracking to develop in the polycarbonate and soon the amount of light transmission through the laminated article drops below permissible levels if the laminated article is to be used for windshield of an automobile. If light transmission and the like are not important, then any other suitable plasticizer may be used.

The polyvinyl acetal is preferably in sheet form, and preferably has a thickness of from about 2 to 60 mils, most preferably 5 to 35 mils. The polyvinyl acetal is preferably dried, for example, for from about 30 minutes to several hours at about 150° F. so that the moisture content of the dried polyvinyl butyral is less than 0.5% by weight and preferably less than 0.2% by weight. The lower moisture contents help to improve the glass to polyvinyl acetal adhesion and thus pre-dried polyvinyl butyral sheet is preferred.

Any suitable phosphate may be used. The most suitable phosphates are those which are highly compatible with the polyvinyl acetal and which have little or no adverse effects on the polyarylcarbonate. The phosphates with little tendency to attack polyarylcarbonate and which have the simultaneous and unique ability to plasticize the polyvinyl acetal preferably have the formula:

$$R_3PO_4$$

wherein R is aryl, alkaryl, alkyl or cycloalkyl, with the proviso that when all of the radicals represented by R in a given compound are alkyl radicals each must have 5 or more carbon atoms. It is possible for R to represent different radicals in the same compound. Moreover, mixtures of these compounds may be used to plasticize the polyvinyl acetal in accordance with this invention. The preferred alkyl radicals have 1 to 9 carbon atoms. The most suitable phosphates have the formula $Ar_3PO_4$ wherein Ar is aryl or alkaryl such as phenyl, cresyl, tolyl, o-tolyl, m-tolyl, m-cumenyl, p-cumenyl, mesityl, 2,3-xylyl and the like. The preferred alkaryl radicals are those which have one benzene ring and which contain from 1 to 3 carbon atoms per side chain and which have from 1 to 3 side chains. Specific examples include triphenyl phosphate, tri-p-cresyl phosphate, tri-2,3-xylyl phosphate, trimesityl phosphate, methyl diphenyl phosphate, dimethyl phenyl phosphate, ethyl di-cresyl phosphate, tripentyl phosphate, trihexyl phosphate, pentyl dihexyl phosphate, octyl dipenyl phosphate, trioctyl phosphate, octyl di-p-cresyl phosphate, tri-cyclohexyl phosphate, cyclohexyl diphenyl phosphate, cyclobutyl diphenyl phosphate, trinonyl phosphate and the like. Tri-p-cresly phosphate is preferred.

The polyvinyl acetal resins which are employed in the present invention may be made from various unsubstituted aldehydes or mixtures thereof or even from unsubstituted ketones containing an active carbonyl group or from mixtures of unsubstituted aldehydes or ketones. Thus, formaldehyde, acetaldehyde, propionaldehyde, butyraldehyde, valeraldehyde, hexaldehyde, benzaldehyde, crotonaldehyde, cyclohexanone and the like and mixtures thereof may be utilized. In general, the acetal resin is made by reacting an aldehyde with hydrolyzed polyvinyl ester in the presence of a solvent for the product and precipitating the resin product with water. Alternate methods might include carrying out the reaction in the presence of a non-solvent dispersing medium such as water or a non-solvent mixture of water and solvent, e.g., a water-ethanol mixture. More detailed methods for preparing such resins are set forth in Morrison et al. U.S. Patent Re. 20,430, dated June 29, 1937, and Lavin et al. U.S. Patent 2,496,480. In general, polyvinyl acetal resins made from saturated lower unsubstituted aliphatic aldehydes are the most suitable. These would include polyvinyl acetal resins made from unsubstituted saturated aliphatic aldehydes containing less than 6 carbon atoms and especially those made from formaldehyde, acetaldehyde, butyraldehyde and mixtures thereof. Particularly preferred are polyvinyl acetal resins made from butyraldehyde. The preferred molecular weight range is 150,000 to 250,000.

In general, the polyvinyl acetal resins employed may be considered to be made up, on a weight basis, of from 5 to 25% hydroxyl groups, calculated as polyvinyl alcohol, 0 to 40% acetate groups, calculated as polyvinyl acetate, and the balance substantially acetal. When the acetal is butyraldehyde acetal, the polyvinyl acetal resin will preferably contain, on a weight basis, from 16 to 25% hydroxyl groups, calculated as polyvinyl alcohol and from 0 to 10% acetate groups, calculated as polyvinyl acetate, the balance being substantially butyraldehyde acetal.

The laminated article of this invention takes advantage of the unusual mechanical properties of glass. Thus, in accordance with this invention the function of the polycarbonate is not purely structural. The function of the polycarbonate is to make the glass function as a structure bearing member even when shattered. Thus, the laminated article of this invention retains a large percentage of its load bearing properties even after the glass has been shattered so that a car body can be constructed where the front and rear windows serve as the sole supporting members for the roof. Such a car body dropped on its top will shatter the glass, but the load bearing properties of the laminated glass are retained sufficiently so that the roof is supported by this main load bearing column. Further illustrations of utility include airplane windshields, loadbearing walls of buildings, partitions and the like.

The polycarbonate may be any suitable film of polycarbonate such as that disclosed in U.S. Patents 3,028,365 and 3,117,019 and is preferably prepared by reacting di-(monohydroxyaryl)-alkanes with derivatives of the carbonic acid such as phosgene and bischloro-carbonic acid esters of di-(monohydroxyaryl)-alkanes.

The aryl residues of the di-(monohydroxyaryl)-alkanes can be alike or different. The aryl residues can also carry substituents which are not capable of reacting in the conversion into polycarbonates, such as halogen atoms or alkyl groups, for example, the methyl, ethyl, propyl, or tert. butyl group. The alkyl residue of the di-(monohydroxyaryl)-alkanes linking the two benzene rings can be an open chain or a cycloaliphatic ring and may be substituted, if desired, for example by an aryl residue.

Suitable di-(monohydroxyaryl)-alkanes are for example (4,4'-dihydroxy-diphenyl)-methane, 2,2-(4,4'-dihydroxy-diphenyl)-propane, 1,1 - (4,4'dihydroxy-diphenyl)-cyclohexane, 1,1-(4,4' - dhydroxyl - 3,3' - dimethyl - diphenyl)-cyclohexane, 1,1 - (2,2'-dihydroxy-4,4'-dimethyldiphenyl)-butane (boiling point: 185–188° C. under 0.5 mm. mercury gauge), 2,2 - (2,2'-dihydroxy-4,4'-di-tert.-butyl diphenyl)-propane or 1,1' - (4,4' - dihydroxy-diphenyl)-1-phenyl ethane, furthermore, methane derivatives which carry besides two hydroxyaryl groups an alkyl residue with at least two carbon atoms and a second alkyl residue with one or more carbon atoms, such as 2,2-(4,4'-dihydroxy-diphenyl) - butane, 2,2 - (4,4' - dihydroxy-diphenyl)-pentane (melting point 149–150° C.), 3,3-(4,4'-dihydroxy-diphenyl)-pentane, 2,2 - (4,4' - dihydroxy-diphenyl)-hexane, 3,3'-(4,4'-dihydroxy-diphenyl)-hexane, 2,2-(4,4'-dihydroxyldiphenyl)-4-methyl-pentane (melting point 151–152° C.), 2,2-(4,4'-dihydroxy-diphenyl)-heptane (boiling point 198–200° C. under 0.3 mm. mercury gauge), 4,4-(4,4'-dihydroxy-diphenyl)-heptane (melting point 148–149° C.), or 2,2-(4,4'-dihydroxy-diphenyl)-tridecane. Suitable di-(monohydroxyaryl)-alkanes the two aryl residues of which are different are for example 2,2-(4,4' - dihydroxy - 3'-methyl-diphenyl)-propane and 2,2-(4,4' - dihydroxy - 3-methyl-3'-isopropyl-diphenyl)-butane. Suitable di-(monohydroxyaryl)-alkanes the aryl residues of which carry halogen atoms are for instance 2,2-(3,5,3',5'-tetra-chloro - 4,4' - dihydroxy-diphenyl)-propane, 2,2-(3,5,3',5'-tetrabromo-4,4'-dihydroxy-diphenyl)-propane, (3,3' - dichloro-4,4'-dihydroxy-diphenyl)-methane and 2,2' - dihydroxy-5,5'-difluoro-diphenyl-methane. Suitable di-(monohydroxyaryl)-alkanes, the alkyl residue of which linking the two benzene rings is substituted by an aryl residue are for instance (4,4' - dihydroxy-diphenyl)-phenyl-methane, and 1,1 - (4,4' - dihydroxy-diphenyl)-phenyl-methane, and 1,1 - (4,4' - dihydroxy-diphenyl)-1-phenyl-ethane.

In order to obtain special properties, mixtures of various di-(monohydroxyaryl)-alkanes can also be used, thus mixed polycarbonates are obtained.

The conversion of the aforesaid di-(monohydroxyaryl)-alkanes into high molecular polycarbonates by reacting with the mentioned derivatives of the carbonic acid may be carried out as known in the art. For instance, the di-(monohydroxyaryl)-alkanes can be re-esterfied with carbonic acid diesters, e.g. dimethyl-, diethyl-, dipropyl-, dibutyl-, diamyl-, dioctyl-, dicyclohexyl-, diphenyl-, and di-o,p-toyl carbonate, at elevated temperatures from about 50 to about 320° C. and especially from about 120 to about 280° C.

The polycarbonates can also be produced by introducing phosgene into solutions of di-(monohydroxyaryl)-alkanes in organic bases, such as dimethylaniline, diethylaniline, trimethylamine and pyridine, or into solutions of di-(monohydroxyaryl)-alkanes in inert organic solvents, such as benzine, ligroine, cyclohexane, methylcyclohexane, benzene, toluene, xylene, chloroform, methylene chloride, carbon tetrachloride, trichloroethylene, dichloroethane, methylacetate and ethylacetate, with the addition of an acid-binding agent as mentioned above.

A process particularly suitable for producing polycarbonates consists in introducing phosgene into the aqueous solution or suspension of alkali metal salts such as lithium-, sodium-, potassium-, and calcium-salts of di-(monohydroxyaryl)-alkanes, preferably in the presence of an excess of a base such as lithium-, sodium-, potassium- and calcium-hydroxide or -carbonate. The polycarbonate precipitates out from the aqueous solution.

The conversion in the aqueous solution is promoted by the addition of indifferent solvents of the kind mentioned above which are capable of dissolving phosgene and eventually the produced polycarbonate.

The phosgene may be used in an equivalent amount,

Generally, however, it is preferable to use an excess of the phosgene.

Finally, it is also possible to react the di-(monohydroxyaryl)-alkanes with about equimolecular amounts of bis-chloro carbonic acid esters of di-(monohydroxyaryl)-alkanes under corresponding conditions.

In the production of polycarbonates according to the various processes it is advantageous to employ small amounts of reducing agents, for example, sodium- or potassium-sulphide, -sulphite and -dithionite or free phenol and p-tert.-butylphenol.

By adding monofunctional compounds which are capable of reacting with phosgene or with the end groups of the polycarbonates consisting of the chlorocarbonic acid ester group and which terminate the chains, such as the phenols for instance the phenol, the tert.-butylphenol, the cyclohexylphenol, and 2,2-(4-hydroxyphenol-4'-methoxyphenyl)-propane, further aniline and methylaniline, it is possible to regulate the molecular weight of the polycarbonates in wide limits.

The recation of the di-(monohydroxyaryl)-alkanes with phosgene or of the chlorocarbonic esters of the di-(monohydroxyaryl)-alkanes may be carried out at room temperatures or at lower elevated temperatures, that is to say at temperatures from the freezing point to the boiling point of the mixture (column 1, line 31 to column 3, line 1 of 3,028,365). The polycarbonate film preferably has a thickness of from about 5 to 250 mil and most preferably from about 60 to about 100 mil. In some cases, it may be desirable to use copolymers of various dihydroxyl aryl propanes in order to achieve special properties.

Other pellucid materials are disclosed in U.S. Patent 3,069,301 at column 1, lines 62 to 68, which are rigid and resistant to scratching and essentially non-hydroscopic.

In the method of the present invention, the final preferred structural glass is prepared by assembling the sheets of polyarylcarbonate, polyvinyl acetal and glass, one on top of the other with polyarlycarbonate in the center sandwiched by polyvinyl acetal or preferably polyvinyl butyral sheets which have been plasticized with a phosphate as disclosed above and finally glass sheets as the outer layers. The assembled laminant is subjected to heat and pressure as more particularly disclosed below to cause the permanent adherence of one layer to the other without harming the polycarbonate or the polyvinyl acetal layer. It is preferred to pre-dry the polyarlycarbonate sheets prior to assembling the laminant. After assembly of the laminant as mentioned above, it is preferred to warm the assembly. Desirably, the warm assembled laminant is passed through de-airing rolls to lightly adhere the layers together and expel the air. The lightly adhered laminant can be subsequently passed through tacking rolls. It is then passed into an oil autoclave or other high pressure equipment and heated to the critical temperature and pressure range of this invention for the critical amount of time as follows:

The temperature must be in the range of from about 325° F. to 400° F. and preferably 330° F. to 340° F. The laminant must be held at this temperature for only about 5 to about 15 minutes and most critical of all the pressure must range from 50 lbs./in.$^2$ downward to just sufficient to hold the laminant together. A pressure of 1 to 50 lbs./in.$^2$ is satisfactory. Moreover, it is preferred to allow the oil, if an oil autoclave is used, to reach the temperature before any significant pressure is applied. Then the assembly is allowed to cool to about 150° F. and removed from the autoclave where it is washed with water and detergent to remove the oil.

Laminants prepared according to the autoclave cycle of the present invention exhibit vastly improved resistance to delamination on impact as compared to those which are prepared by the conventional molding cycle using a pressure of about 180 to 250 p.s.i. As will become apparent from the following working examples, if the heat, pressure, time, laminating cycle is 340° F. at a maximum of 50 p.s.i. for about 10 minutes, then much better adhesion between the polyarylcarbonate and the polyvinyl butral results. The temperature range is critical because at lower temperatures insufficient softening of the polycarbonate surface results to achieve a good bond whereas at higher temperatures the polycarbonate tends to flow too much. Also, the polyvinyl butyral is damaged by high laminating temperatures. Still further, the laminants prepared according to the new autoclave cycle show greatly improved resistance to low temperatures which was not at all to be expected from changing the conditions to use less pressure. It was to be expected according to the prior art that when faced with the problem of poor adhesion and poor resistance to impact, that one should go to higher pressures. Contrary to what was to be expected, it was found that it was necessary, even while holding the temperature in the previously taught range of 250 to 350° F., to reduce the pressure to a negligible range sufficient only to hold the laminant together.

The structural glass of the invention is useful in many areas including the preparation of windshields for automobiles, structural glass members and the like.

The invention is further illustrated by the following examples in which parts are by weight unless otherwise specified. Unless otherwise indicated, the polyvinyl acetal resin used throughout these examples is polyvinyl butyral resin having a moisture content of 2.0% and contains approximately 21% hydroxyl groups calculated as polyvinyl alcohol and approximately 2% acetate groups calculated as polyvinyl acetate, the balance being substantially butyral, average molecular weight is about 200,000. About 100 parts of polyvinyl butyral are used with about 40 parts of tri-p-cresyl phosphate unless otherwise indicated. A cake is prepared by mixing together the polyvinyl butyral and the tricresyl phosphate to prepare a plasticized cake. The cake is skived to prepare a sheet of the stated thickness.

Example 1

A sheet of plate glass about 12 x 12 inches having a thickness of about 125 mils is covered with a sheet of dried polyvinyl butyral containing the tri-p-cresyl phosphase plasticizer, about 12 x 12 inches and having a thickness of about 15 mils. A sheet of polyarylcarbonate having a thickness of about 90 mils which measures about 12 x 12 inches and which is prepared according to U.S. Patent 3,117,019 from phosgene and 2,2-bis(4-hydroxy phenyl)-propane and having a relative viscosity of about 1.35 measured in methylene chloride at 25° C. is placed on top of the dried polyvinyl butyral. The polyarylcarbonate is pre-dried in an oven at about 250° F. for about four hours. Then another sheet of dried polyvinyl butyral, and another sheet of glass identical to the first two sheets are placed on the polyarylcarbonate in the order named. The assembly is warmed to about 100° F. and then passed through de-airing rolls to lightly adhere the layers and expel air. It is then heated to 160° F. and passed through tacking rolls. The assembly is then placed in an oil autoclave and heated to a temperature of 340° F. and a pressure of about 10 p.s.i. for about 10 minutes. The temperature is reduced about 150° F. and then the pressure is released. The glass is washed with detergent and water to remove the oil. The laminant so constructed had good optics, but when subjected to Dry Ice chest temperatures for about 30 minutes and then impacted with a 20 ft. pound impact there was some minor delamination of the glass and the polycarbonate.

When the foregoing example is repeated except that the assembly is heated to a temperature of 275° F. and the pressure of 200 p.s.i. for about 15 minutes in the oil autoclave and then subjected to Dry Ice temperatures for 30 minutes and subsequently impacted with 20 ft. pounds, severe delamination occurs.

Example 2

The foregoing example is repeated except that a polyvinyl butyral resin as described above is used which contains about 100 parts polyvinyl butyral and about 20 parts of tri-p-cresyl phosphate. The assembly using this polyvinyl butyral sheet is subjected to a temperature of about 340° F. and a pressure of 50 p.s.i. maximum for about 10 minutes. The cooled and cleaned laminant prepared as described in Example 1 is then placed in a Dry Ice chest for about 30 minutes and subjected to an impact of about 20 ft. pounds. There is some minor delamination in the area of impact, but otherwise there is essentially no delamination.

The foregoing example illustrates that, surprisingly, one may use less of the plasticizer preferably 5 to 30% by weight and low pressure and obtain a better laminant which is more resistant to impact even after having been subjected to Dry Ice temperatures. The laminants of the prior art showed high resistance to impact and delamination, but conditions there were somewhat different in that the earlier laminants had not been subjected to Dry Ice temperatures before being impacted.

Example 3

Example 1 is repeated except that the plate glass is replaced with chemically tempered glass having a thickness of about 60 mils and sold under the tradename of Chemcor by Corning Glass Works.

This laminant when subjected to Dry Ice temperatures and then impacted shows substantially no delamination.

It is to be understood that the foregoing examples are given for the purpose of illustration and that any other suitable glass, polyvinyl acetal, polycarbonate or the like could be used provided that the teachings of this disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A laminated article comprising a sheet of polyarylcarbonate bonded to a transparent panel with a sheet of polyvinyl acetal by assembling the three components with the polyvinyl acetal between the polyarylcarbonate and the transparent panel and heating the assembled article for from about 5 to about 15 minutes at a temperature of from 300 to 400° F. and a pressure ranging from that sufficient to hold that laminate together to about 50 lbs./in.$^2$.

2. The article of claim 1 wherein said transparent panel is a sheet of glass.

3. A method of preparing a laminated article comprising a sheet of polyarylcarbonate bonded to a transparent panel with a sheet of polyvinyl acetal which comprises assembling the three components with the polyvinyl acetal between the polyarylcarbonate and the transparent panel and heating that assembled article of 5 to 15 minutes at a tempertaure of 300 to 400° F. and a pressure of 1 to 50 lbs./in.$^2$.

4. An improved method of laminating polyarylcarbonate to glass which comprises preparing a five layer laminant of polyarylcarbonate sandwiched between sheets of polyvinyl acetal which are in turn sandwiched between sheets of glass and subjecting the assembled laminant to a temperature of 300 to 400° F., and a pressure of from about 1 to 50 lbs./in.$^2$ for from about 5 to 15 minutes.

5. A method of preparing a five layer laminated glass article having high load bearing properties, good resistance to impact and good stability to Dry Ice temperatures which comprises assembling a pre-dried sheet of polyarylcarbonate between two sheets of polyvinyl acetal, plasticized with tricresyl phosphate in an amount of from about 10 to 30% by weight as essentially the sole plasticizer therefor, assembling the resulting three part laminant between two sheets of glass, lightly adhering the resulting five part laminant by passing it through de-airing molds, passing the resulting assembled laminant into an oil autoclave, heating the laminant to a temperature of from about 330 to 340° F., applying pressure to the assembled laminant in the oil autoclave at said temperature within the range of from about 1 to 50 p.s.i. for from about 5 to 15 minutes, reducing the temperature in said autoclave to about 150° F., reducing the pressure and removing said laminated article from the autoclave.

References Cited

UNITED STATES PATENTS

| | | | |
|---|---|---|---|
| 2,290,193 | 7/1942 | Kirkpatrick | 161—199 X |
| 2,423,565 | 7/1947 | Rodman | 260—42 |
| 2,425,568 | 8/1947 | Ryan et al. | 161—199 |
| 2,534,102 | 12/1950 | Buckley et al. | 161—199 |
| 2,787,568 | 4/1957 | Koblitz | 161—183 |
| 3,351,518 | 11/1967 | Ryan | 156—100 X |
| 3,354,025 | 11/1967 | Aykanian et al. | 156—106 X |

OTHER REFERENCES

G. E. Lexan, "Polycarbonate Resins," Tech. Report C.D.C.—501, January 1962, pages 7 and 8, copy in Class 151, Polycarbonate Digest.

G. E. Lexan, "Polycarbonate Resins," Tech. Report C.D.C.—502, January 1962, pages 7 and 8, copy in Class 161, Sub. 183.

HAROLD ANSHER, *Primary Examiner.*